United States Patent [19]

Plume

[11] Patent Number: 4,670,789
[45] Date of Patent: Jun. 2, 1987

[54] TELEVISION TRANSMITTER

[75] Inventor: Edward G. Plume, Cottenham, England

[73] Assignee: U.S. Philips Corporation, New York, N.Y.

[21] Appl. No.: 774,421

[22] Filed: Sep. 10, 1985

[30] Foreign Application Priority Data

Sep. 17, 1984 [GB] United Kingdom ............... 8423440

[51] Int. Cl.[4] .............................................. H04N 5/38
[52] U.S. Cl. .................................. 358/186; 328/187; 358/10; 358/139; 455/115
[58] Field of Search ................. 358/186, 187, 139, 10; 455/115; 328/186, 187, 188

[56] References Cited

U.S. PATENT DOCUMENTS

| | | | |
|---|---|---|---|
| 2,963,579 | 12/1960 | Berry | 328/186 |
| 3,730,984 | 5/1973 | Smith | 358/139 |
| 3,996,419 | 12/1976 | Kennedy | 358/187 |
| 4,041,534 | 8/1977 | Chabanel | 358/186 |
| 4,092,674 | 5/1978 | Rhodes | 358/186 |
| 4,276,564 | 6/1981 | Watson | 358/139 |
| 4,434,440 | 2/1984 | Schiff | 358/186 |
| 4,538,180 | 8/1985 | Cluniat | 358/186 |

*Primary Examiner*—Howard W. Britton
*Attorney, Agent, or Firm*—Thomas A. Briody; Jack Oisher; William J. Streeter

[57] ABSTRACT

A television transmitter comprises a video signal input (1) feeding a modulator (2), a pre-corrector (3), an up converter (4) and power amplification stages (5,6). The stage (6), typically a Klystron amplifier, is operated in a non-linear mode to increase efficiency and the pre-corrector (3) is provided to provide a correction for the output amplifier stage non-linearity. A portion of the output signal is coupled to a demodulator (8) whose output is fed to measurement means (9). The measurement means (8) measures the distortion of the output, for example non-linearity, differential gain, etc., and applies a signal to a computer (11) via an interface circuit (10). The computer then calculates control signals which are applied through the interface circuit (10) to the pre-corrector (3). The control signals are effective to vary the transfer characteristic of the pre-corrector circuit (3) in such a manner as to reduce the output distortion to a minimum value.

10 Claims, 12 Drawing Figures

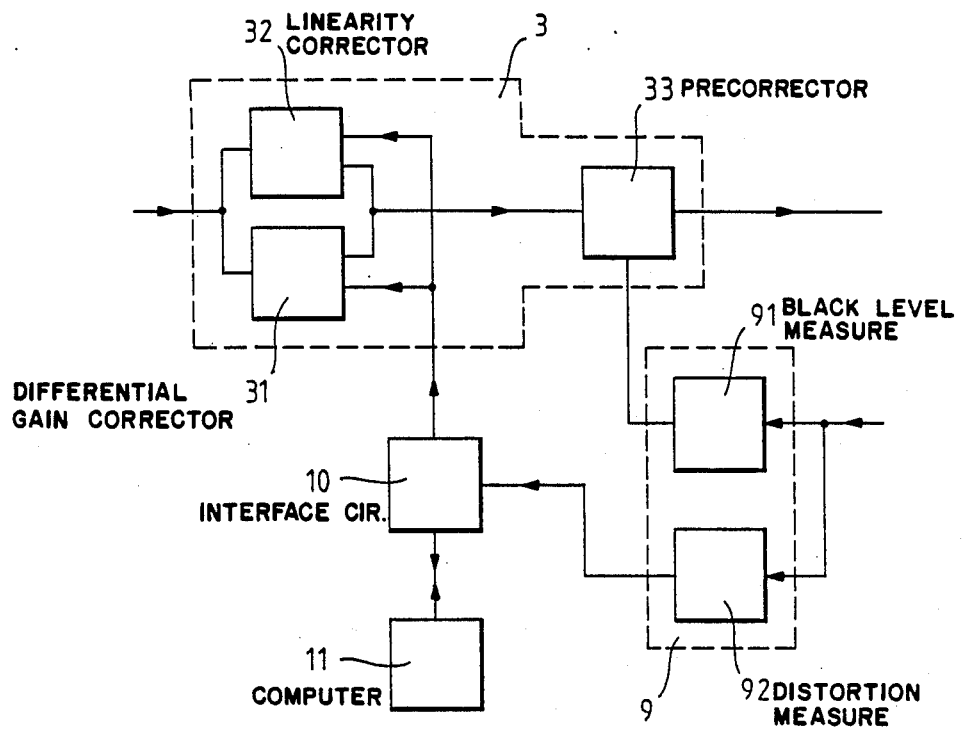
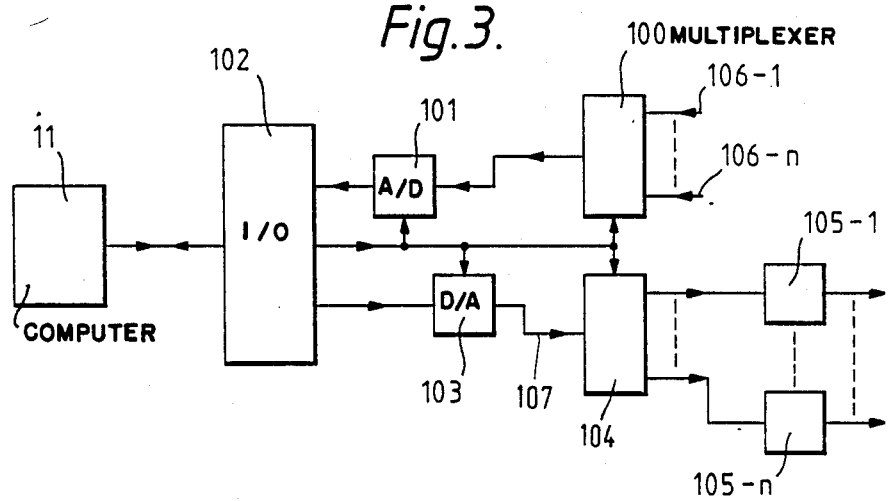

TELEVISION TRANSMITTER

The invention relates to a television transmitter comprising a video signal input for receiving an input video signal which comprises a test signal inserted in a television line during the frame blanking interval; means for modulating a carrier signal by the video signal; non-linear power amplifier means for amplifying the modulated carrier signal; a pre-corrector circuit for applying a correction to the modulated signal before it is applied to the power amplifier means; means for measuring the distortion in the output of the power amplifying means, the distortion measuring means comprising means for demodulating the signal produced at the output of the power amplifying means, means for selecting the line in which the test signal is transmitted, and means for measuring the distortion of at least a portion of the test signal; means for generating a control signal representative of the measured distortion of the output of the power amplifying means; and means for applying the control signal to a control input of the pre-corrector circuit.

Such a transmitter has been disclosed in a paper entitled "Improved Performance Stability of Beam Control Klystron Transmitters" read by P. G. Douglas and M. N. Kyffin at The Colloquium on "Efficiency Improvements in UHF Transmitters" on 27th February 1984 organised by The Institution of Electrical Engineer and published in the Conference Proceedings. In the transmitter disclosed in that paper a pre-corrector circuit having a constant transfer characteristic complementary to the nominal transfer characteristic of the Klystron is used. Since the transfer characteristic of the pre-corrector circuit is non linear a degree of control of the pre-correction can be achieved by varying the level of the input signal applied to the pre-corrector circuit. To achieve this control of the degree of pre-correction and to provide, at the same time, a constant level signal to the input of the amplifying stages gain controlled amplifiers are provided before and after the pre-corrector circuit. Thus if the input signal is to be moved to a different part of the pre-corrector circuit characteristic the gain of the amplifier before the pre-corrector circuit is increased or decreased and the gain of the amplifier after the pre-corrector circuit is decreased or increased by an appropriate amount to maintain a constant signal level. The output of the power amplifying means is monitored and the non-linearity measured. From the measured non-linearity a control voltage is generated to adjust the gain of the amplifiers in such a manner that the non-linearity is reduced. This arrangement has given an improved performance as regards the linearity of the output of the transmitter and as a by-product also an improvement in differential gain. However there is no means of independently compensating for different transmitter parameters.

SUMMARY OF THE INVENTION

It is an object of the invention to enable the provision of an alternative means for improving the performance of a television transmitter.

The invention provides a television transmitter as set forth in the opening paragraph characterised in that the pre-corrector circuit comprises a plurality of subsidiary correction circuits, each subsidiary pre-correction circuit being provided primarily for correction of a given different parameter and that the control signal comprises a plurality of subsidiary control signals for application to the corresponding subsidiary pre-correction circuit to vary the transfer characteristic of the pre-correction circuit in such a manner as to reduce the distortion to a minimum value.

This gives the advantage of greater flexibility of correction since a fixed pre-corrector circuit characteristic is not used so that the characteristic can be more accurately tailored to the characteristics of the amplifying means, typically a Klystron. It also gives greater scope for individually correcting for the various distortions produced, e.g. non-linearity, differential gain, differential phase, carrier phase modulation. The characteristics of the pre-corrector circuit may be adjusted to compensate for any or all of these effects as a greater degree of freedom exists.

The transmitter may comprise means for measuring the linearity of the output of the power amplifying means, means for generating a subsidiary linearity control signal representative of the linearity of the output of the power amplifying means, and means for applying the subsidiary linearity control signal to a control input of a subsidiary linearity pre-corrector circuit to vary the transfer characteristic thereof in such a manner as to reduce the non-linearity to a minimum value.

The linearity pre-corrector circuit may have a plurality of control inputs, a control signal applied to each input being effective to independently vary the transfer characteristic of the linearity pre-corrector.

The transmitter may comprise means for measuring the differential gain of the output of the power amplifying means, means for generating a subsidiary differential gain control signal representative of the differential gain of the output of the power amplifying means, and means for applying the subsidiary differential gain control signal to a control input of a subsidiary differential gain pre-corrector circuit to vary the transfer characteristic thereof in such a manner as to reduce the differential gain to a minimum value.

The differential gain pre-corrector circuit may have a plurality of control inputs, a control signal applied to each input being effective to independently vary the transfer characteristic of the differential gain pre-corrector.

The linearity and/or differential gain pre-correctors may each comprise a plurality of individually controllable attenuators, the control signals controlling the gain of the attenuators and setting the gain of the attenuators to different values above and below a selected input signal amplitude, the selected input signal value being independently selectable for each attenuator.

A television transmitter may comprise both linearity and differential gain pre-correctors, the linearity pre-corrector comprising a filter which passes only double sideband frequencies.

Thus the pre-corrector circuit may be adjusted independently for linearity and differential gain although there may be some interaction between the two adjustments and consequently, if this is so, a compromise position may emerge which gives the best overall performance but in which the linearity and differential gain may not be reduced to the minimum level that could be achieved if the effect on the other was disregarded.

The portion of the test signal may comprise a staircase waveform comprising a plurality of equal sized steps extending from black level to peak white level and the means for measuring the linearity may then comprise means for comparing the amplitude of each step with a reference value. The reference value for each step may be derived from a potential divider connected between voltages corresponding to the top and bottom of the staircase.

The portion of the test signal may comprise a staircase waveform having a constant amplitude colour sub-carrier signal superimposed on each step thereof and the means for measuring the differential gain may then comprise means for measuring the amplitude of the sub-carrier signal superimposed on each step, and means for producing output signals proportional to the amplitude of the sub-carrier signal superimposed on each of the steps of the staircase.

The transmitter may comprise a clamping circuit through which the sub-carrier signal superimposed on all the steps of the staircase is passed, the action of the clamping circuit being controlled so that the amplitude of the output representative of the amplitude of the sub-carrier signal superimposed on the step below the peak white value maintains a substantially constant value.

The use of a test signal on a line during the frame blanking interval provides a convenient means for monitoring the output of the transmitter and enables the distortions introduced by the power amplifying means to be measured and the appropriate control signals to be produced.

The spectrum radiated by a television transmitter may be considered as two separate parts, the luminance part which is substantially centred around the vision carrier and a chrominance part centred around a subcarrier which is spaced from the vision carrier by typically around 4 MHz. These two parts are subject to differing amounts of distortion when passed through a non-linear amplifier. This is partly due to the frequency difference and partly to the vestigial sideband nature of the transmission.

The invention enables the provision of a pre-corrector capable of treating these two parts separately.

In addition to linearity correction which is primarily a correction of the luminance part and differential gain which is primarily a correction of the chrominance part other corrections which again tend to be concerned mainly with the luminance or chrominance parts separately are carrier phase modulation (luminance) differential phase (chrominance) and chrominance to luminance gain.

If two all pass filters are employed, one having its resonant frequency near to the vision carrier and the other near to the sub-carrier and the resonant frequency or 'Q' is varied in sympathy with a pre-distorted video waveform then a control of delay and hence phase can be obtained. Thus pre-correction of carrier phase modulation and differential phase can be obtained. Consequently these two parameters can be measured and used to control the circuits which create the pre-distorted video in an iterative fashion to minimise carrier phase modulation and differential phase.

A further parameter which can be measured is chrominance to luminance gain. This is a measure of the relative amplitudes of the two components and therefore is an indication of the amplitude/frequency response of the transmitter. In an ideal transmitter this remains constant. However drift caused by temperature and time can cause a 'tilt' in this response. By feeding a signal proportional to the chrominance-luminance gain error to a varactor diode forming part of a tuned circuit through which the modulated i.f. signal passes this "tilt" can be pre-corrected by causing the i.f. signal to lie on one side or the other of the resonant frequency.

An embodiment of the invention will now be described, by way of example, with reference to the accompanying drawings.

DESCRIPTION OF THE FIGURES

FIG. 2 shows the measurement means, computer and pre-corrector circuits used in the transmitter of FIG. 1 in greater detail, FIG. 3 shows the computer and computer interface circuits in greater detail.

DESCRIPTION OF THE PREFERRED EMBODIMENT

Figure 1:
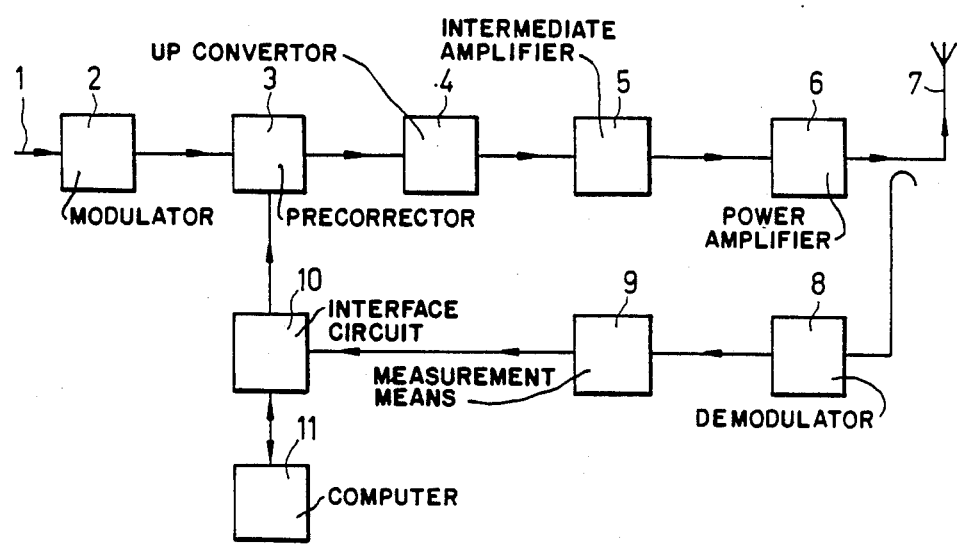
FIG. 1 shows in block schematic form a television transmitter according to the invention.
Figure 4:
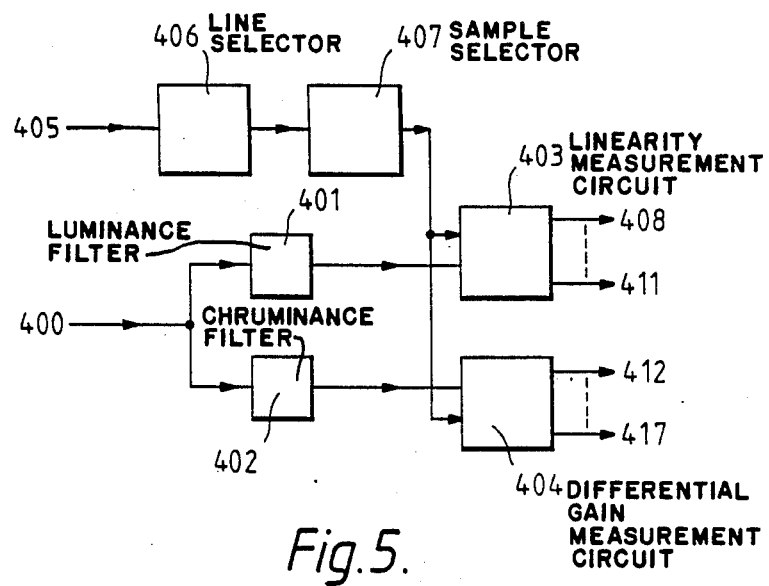
FIG. 4 shows the measurement means of FIG. 2 in greater detail.

The television transmitter shown in FIG. 1 comprises a video signal input 1 which is fed to a modulator 2 in which a carrier signal is modulated by the video signal. The modulated carrier signal is then fed to a pre-corrector circuit 3 where a correction is applied to compensate for the distortion introduced by a later power amplification stage. The pre-corrected signal is then fed through an up converter 4, an intermediate power amplifier 5 and a power amplifier 6 to an aerial 7. A portion of the output of the power amplifier 6 is coupled to the input of a demodulator 8 whose output is fed to a measurement means 9. The measurement means 9 produces a signal which is representative of the distortion in the output of the power amplifier 6 and applies this signal through an interface circuit 10 to a computer 11. The computer 11 generates a control signal from the signal applied to it from the measurement means and applies the control signal to the pre-corrector circuit 3 via the interface circuit 10.

Various parameters of the output signal can be measured and the pre-correction circuit 3 can be adjusted to reduce their values to a minimum value. Such parameters are linearity, differential gain, differential phase, carrier phase, etc.

FIG. 2 shows the measurement means 9 and pre-corrector circuit 3 in more detail and their interconnection with the computer 11. The pre-corrector circuit 3 comprises a pre-corrector for differential gain 31, a pre-corrector for linearity 32, and an AGC circuit 33. The measurement means 9 includes means 91 for measuring the black level power which is connected to a control input of the AGC circuit 33 and means 92 for measuring the output signal distortion which is connected via the interface 10 to the computer 11. The pre-corrector 3 can, of course, be extended to correct for any measured parameter.

FIG. 3 shows the computer 11 and interface circuit 10 in greater detail. The computer 11 is connected to the measurement means 9 via a multiplexer 100, an analogue to digital converter (ADC) 101 and an I/0 port 102. It is connected to the pre-corrector 3 via the I/0 port 102, a digital to analogue converter (DAC) 103, a demultiplexer 104, and one or more analogue output circuits 105-1 to 105-n. The computer 11 selects a desired one of the analogue inputs 106-1 to 106-n which are fed from the measurement means 9 by means of signals on a line 107. This signal is converted into digital form by the ADC 101 and passed to the computer 10 via the I/0 port 102. The computer 10 then computes an appropriate control signal which is fed to the DAC 103 in which it is converted to analogue form. The analogue signal is fed via the demultiplexer 104 to a selected analogue output circuit 105, the output circuit being selected by a signal generated in the computer 11 and fed via line 107 to the demultiplexer 104. The output circuits 105, one for each control signal input of the pre-correction circuit 3, comprise a sample and hold circuit which is required as a particular output of the demultiplexer is present only for a limited period.

In one embodiment the computer 11 was a BBC Model B computer manufactured and sold by Acorn Computers Ltd while the I/0 port 102 was a Rockwell versatile interface adaptor type R6522.

The means for measuring the output signal distortion 92 comprises an input 400 to which, in operation, the demodulated video signal is applied and which is connected to the input of a luminance filter 401 and to the input of a chrominance filter 402. The output of the luminance filter 401 is fed to a linearity measurement circuit 403 while the output of the chrominance filter 402 is fed to a differential gain measurement circuit 404. An input 405 to which, in operation, synchronising signals are applied is fed to a line selector circuit 406 whose output is connected to a sample selector circuit 407. The output of the sample selector circuit 407 is fed to control inputs of the linearity measurement circuit 403 and the differential gain measurement circuit 404. The linearity measurement circuit 403 has four outputs 408, 409, 410 and 411 which are fed to the multiplexer 100. The differential gain measurement circuit 404 has six outputs 412, 413, 414, 415, 416 and 417 which are also fed to the multiplexer 100. The linearity and differential gain of the transmitter are measured by use of the insertion test signals which are inserted on lines 19 and 332 of the video signal transmitted by the British Broadcasting Corporation and the Independent Broadcasting Authority in the U.K. Other insertion test signals could be used with appropriate modifications to the measurement means. The line selector 406 detects from the synchronising pulses when one or both of lines 19 and 332 are present and enables the sample selector 407. The sample selector 407 then enables inputs of the linearity and differential gain measurement circuits 403 and 404 at appropriate times during line 19 and/or 332.

Figure 5:
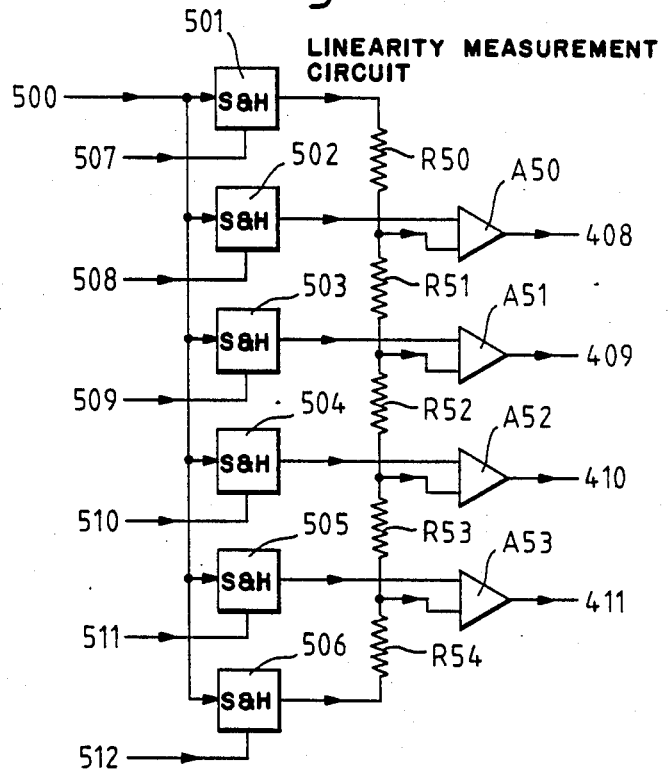
FIG. 5 shows the linearity measurement means of FIG. 4 in greater detail.

The linearity measurement circuit 403 is shown in greater detail in FIG. 5. An input 500 to which the output of the luminance filter is connected is coupled to the inputs of six sample and hold circuits 501–506. The output of the sample and hold circuit 501 is connected to one end of a series arrangement of five equal valued resistors R50 to R54, the other end of the series arrangement being connected to the output of the sample and hold circuit 506. The outputs of the sample and hold circuits 502–505 are connected to first inputs of differential amplifiers A50–A53 respectively. The junction of resistors R50 and R51 is connected to a second input of the differential amplifier A50, the junction of resistors R51 and R52 is connected to a second input of the differential amplifier A51, the junction of resistors R52 and R53 is connected to a second input of the differential amplifier A52, and the junction of resistors R53 and R54 is connected to a second input of the differential amplifier A53. The outputs of the differential amplifiers A50–A53 are connected to outputs 408–411 respectively. Six inputs 507–512 are connected to the sample inputs of the sample and hold circuits 501–506 respectively and are fed with signals from the sample selector 407 so that the insertion test signal is sampled at instants corresponding to successive values of the staircase portion. Thus the outputs of the sample and hold circuit 501 and 506 correspond to white and black respectively while the outputs of the sample and hold circuits 502–505 are the intermediate, nominally equal valued, steps. Thus if the output signal of the transmitter is linear then the output of each of the sample and hold circuits 502–505 will be equal to the voltage at the corresponding point of the potential divider formed by resistors R50–R51 and hence the outputs of the differential amplifiers A50–A53 will be zero. However, if any non-linearity occurs then one or more of the sample and hold circuits 502–505 will produce a voltage which is not equal to that produced at the corresponding point on the potential divider and hence one or more of the differential amplifiers will produce a non-zero output. This output is a measure of the non-linearity of the transmitter output and is fed to the computer 11.

Figure 6:
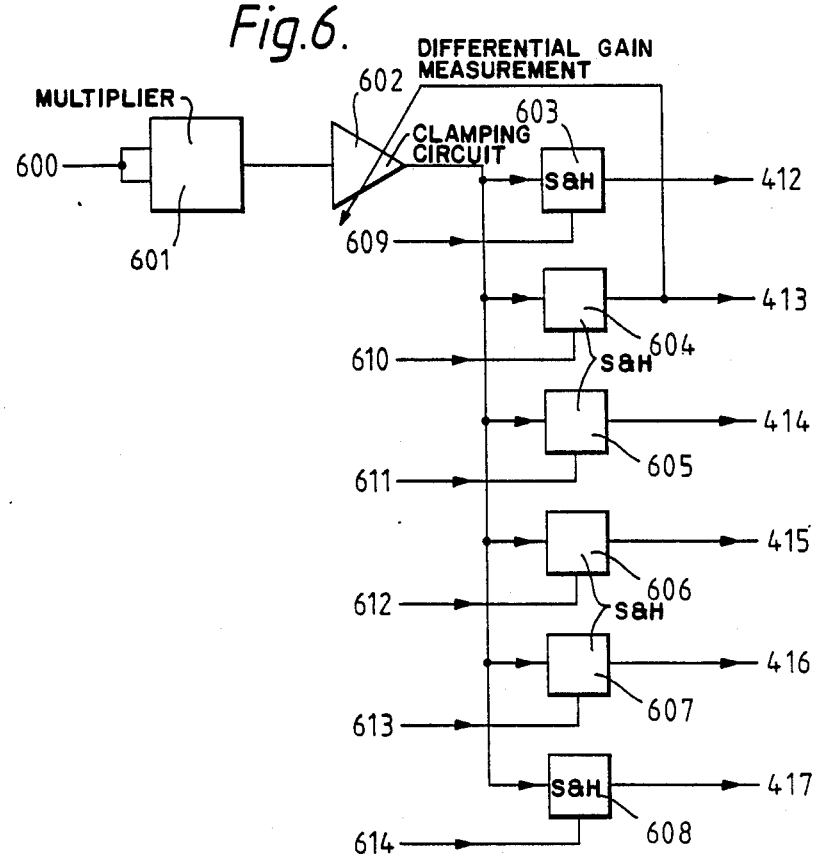
FIG. 6 shows the differential gain measurement means of FIG. 4 in greater detail.
Figure 7:
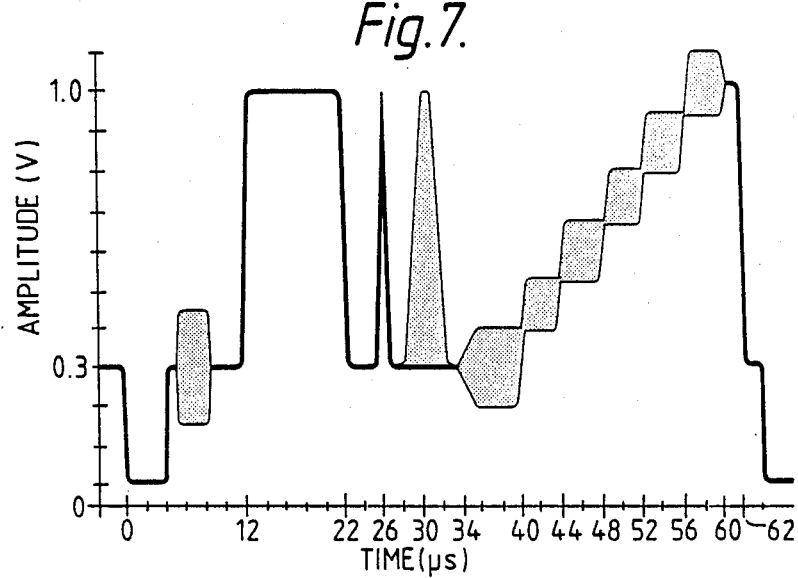
FIG. 7 shows a test signal which is inserted in a line during the frame blanking period.

The differential gain measurement circuit 404 is shown in greater detail in FIG. 6 and comprises an input 600 which is fed to first and second inputs of a multiplier circuit 601 which acts as a demodulator. The output of the multiplier 601 is fed via an amplifier and clamping circuit 602 to first inputs of six sample and hold circuits 603–608. The outputs of the sample and hold circuits 603–608 are fed via lines 412–417 respectively to the multiplexer 100. Six input lines 609–615 are connected to the sample inputs of the sample and hold circuits 603–608 respectively and are fed from the sample selector 407 to cause each of the sample and hold circuits to sample the subcarrier superimposed on a selected step of the staircase waveform. The sample and hold circuit 603 samples the white level subcarrier superimposed on the top of the staircase while the sample and hold circuit 608 samples the black level subcarrier superimposed on the bottom of the staircase, the subcarrier superimposed on the intermediate steps of the staircase being sampled by the successive sample and hold circuits. The output of sample and hold circuit 604 is fed back to the amplifier and clamping circuit 602 to clamp the output of the subcarrier demodulator OV. This particular step of the staircase
is chosen since it is the most likely to be correct as even when the power amplifier is driven into saturation the signal level corresponding to that step will normally still be in the linear region of its characteristic.

Consequently if the amplitude of the subcarrier signal on any of the other steps is not equal to that on the step sampled by the sample and hold circuit 604 a non-zero output will be produced on the appropriate output line indicating the degree of differential gain. The output lines 412-417 are fed to the computer 11 where their signal values are used to calculate the necessary control signals to be applied to the pre-corrector circuit in order to reduce the differential gain to a minimum value. It should be noted that since the output of sample and hold circuit 604 on line 413 is always held at OV it is not strictly necessary to feed this signal to the computer 11 as the computer 11 can be programmed to assume this value.

Figure 8:
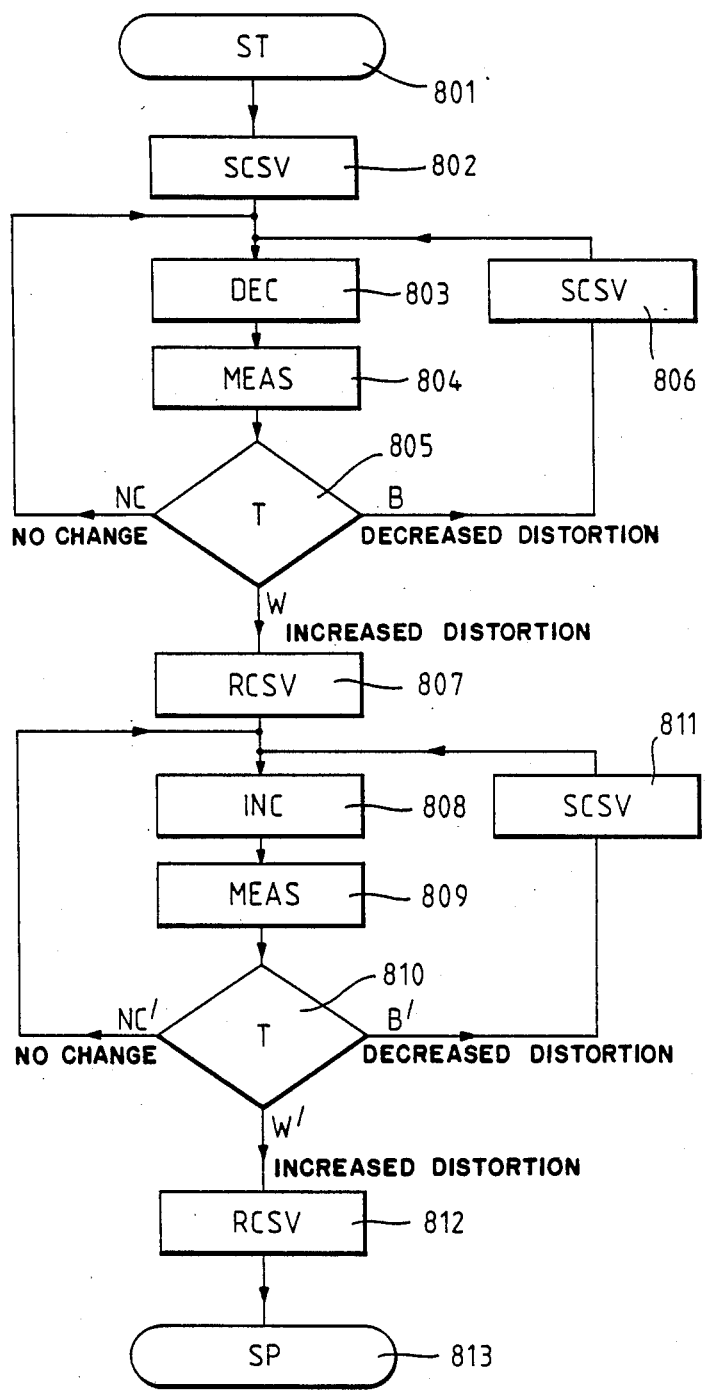
FIG. 8 is a flow diagram showing the operation of the computer in generating the control signals to be fed to the pre-corrector circuits.

FIG. 8 is a flow diagram showing the steps by which the computer 11 produces appropriate control signals for the pre-corrector circuit 3 in order to reduce the distortion in the transmitter output to a minimum value.

In FIG. 8 box 800 represents the start state (ST) and the first action represented by box 801 is to set and store an initial value for the control signal (SCSV). This value is then decremented (DEC), box 802, by a preset amount which may vary depending on the amount of distortion measured in the transmitter output and on the effect of the preceding adjustments. The value of a parameter is measured (MEAS), box 803, and than a test (T) is carried out, box 804, to determine whether the distortion, e.g. non-linearity, differential gain, has increased, decreased or remained the same. If the distortion has decreased the line marked B is followed and the new control signal value is stored (SCSV), box 806. This value is decremented once more and the distortion measured and compared with the previous value. This process is repeated until either no change in the distortion is found or the distortion is increased. In the former case the line marked NC is followed and the control signal value is decremented and the distortion measured and compared with the previous value again. This process is repeated until either the distortion is reduced, in which case line B is followed or the distortion is increased in which case line W is followed.

When the distortion is found to increase or if the adjustment limit has been reached then line W is followed and the control signal value is restored (RCSV), box 807, either to the initial value set by box 802 or to the value set by box 806 depending on whether a better result was obtained over that given by the initial setting. The control signal value is then incremented (INC) by a preset amount which may vary depending on the amount of distortion measured in the transmitter output, box 808. The value of a parameter is measured (MEAS), box 809, and subsequently a test (T) is carried out, box 810, to determine whether the distortion, e.g. non-linearity, differential gain, has increased, decreased, or remained the same. If the distortion has decreased the line marked B' is followed and the new control signal value (SCSV) is stored, box 811. This new value is incremented once more and the distortion measured and compared with the previous value. This process is repeated until either no change in the distortion is found or the distortion is increased. In the former case the line NC' is followed, the control signal value is incremented and the distortion is measured and compared with the previous value again. This process is repeated until either the distortion is reduced, in which case the line B' is followed, or the distortion is increased, in which case the line W' is followed.

When the distortion is increased the control signal value is restored (RCSV), box 812, to either the value stored in box 807 or to the value stored in box 811 depending on whether there was a lower distortion with any other control signal value than that originally set in box 807. Since the control signal values have now been both decremented and incremented the best value has now been detected and the optimisation of the control signal value has been achieved and hence the process ends (SP), box 813.

This process is carried out for each measured parameter separately but as there may be some interaction between the various adjustments for the different parameters it is preferable to compromise on the ideal setting for one parameter to ensure that other parameters do not become worse and in particular to ensure that once any parameter is within the specification to ensure that further increases in performance of that parameter do not cause any other parameters to be taken out of the specification.

Since, as can be seen from the detailed embodiments of the measuring means each parameter provides more than one input to the computer it is necessary to ensure that the best compromise is made in adjusting the pre-corrector to obtain the best overall performance. Thus the test on each parameter is arranged to check for the lowest sum of the deviations in the inputs relating to the particular parameter.

Since the test signals are available 25 times per second (or 50 times per second if both fields are used) it is convenient to average the measurements over several frames (fields) to ensure that temporary distortions of the test signal do not cause large changes in the control signal value. Thus because of the plentiful supply of test signals the adjustment of the pre-correctors may be made relatively quickly without allowing transient distortions in the test signal to upset the pre-corrector setting.

Figure 9:
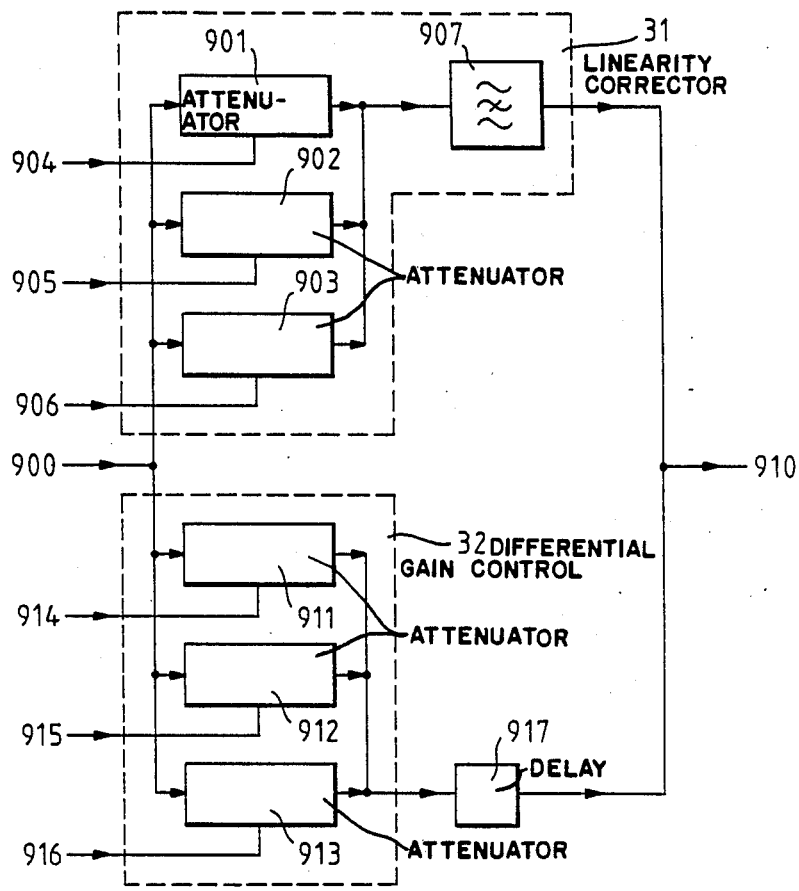
FIG. 9 is a block diagram of pre-corrector circuit suitable for use in the transmitter shown in FIG. 1.
Figure 10:
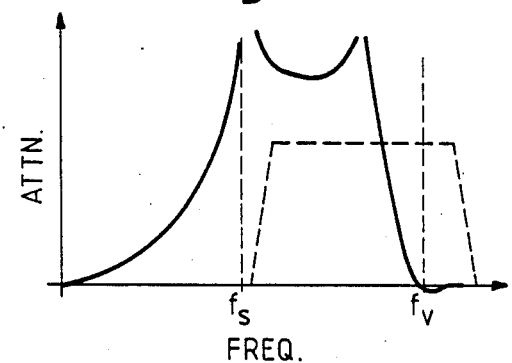
FIG. 10 shows the characteristics of a band pass filter used in the pre-corrector circuit of FIG. 9.

An embodiment of the pre-corrector circuit 3 is shown in greater detail in FIG. 9 and comprises video signal input 900 which is applied to a linearity corrector 31 and a differential gain corrector 32. The linearity corrector 31 comprises three controllable attenuators 901, 902, and 903 arranged in parallel and controlled by control signals applied to control inputs 904, 905, and 906. The control signals are those generated by the computer 11 and fed to appropriate ones of the output circuits 105. The outputs of the attenuators 901, 902, and 903 are fed via a band stop filter 907 to the output 910 of the pre-corrector circuit 3. The attenuation/frequency characteristic of the band stop filter 907 is illustrated in FIG. 10 where $f_s$ is the frequency of the sound carrier and $f_v$ the frequency of the vision carrier.

The differential gain corrector 32 comprises three controllable attenuators 911, 912, and 913 arranged in parallel and controlled by control signals applied to control inputs 914, 915, and 916. The control signals are those generated by the computer 11 and fed to appropriate ones of the output circuits 105. The outputs of the attenuators 911, 912, and 913 are fed via a signal delay arrangement 917 to the output 910. The delay arrangement 917 is arranged to compensate for the signal delay through the bandstop filter 907.

The pre-corrector circuit shown in FIG. 9 operates on the principle that differential gain (all single sideband information) is corrected by the unfiltered section while further correction except at single sideband frequencies is added to correct the linearity. There will, of course, be some interaction between the linearity and differential gain correctors with this arrangement.

Figure 11:
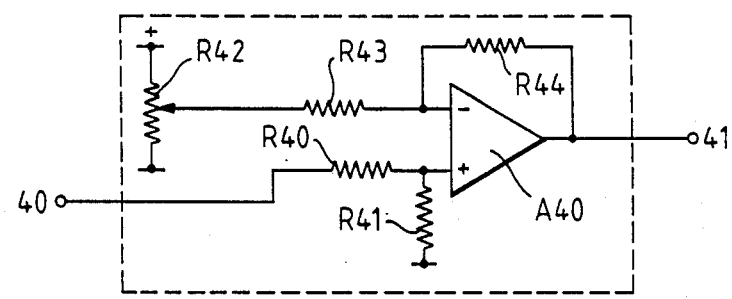
FIG. 11 shows a circuit for producing control voltages for the pre-corrector circuit of FIG. 9.

FIG. 11 shows a circuit for producing a control voltage for the controllable attenuators, the circuit comprising an input 40 which is connected to one of the output circuits 105 of the computer interface 10 and an output 41 which is connected to the control input of one of the controllable attenuators in the pre-corrector circuit 3. A separate circuit as shown in FIG. 11 is provided to connect the computer interface to each of the controllable attenuators in the pre-corrector circuit 3. The input 40 is connected via a resistor R40 to the (+) input of the differential amplifier A40, the junction of resistor R40 and the (+) input being connected via a resistor R41 to ground. A potentiometer R42 is connected between positive and negative supply voltages and its wiper is connected to the (−) input of the differential amplifier A40 via a resistor R43. A resistor R44 is connected between the (−) input and the output of the differential amplifier A40 while the output of the differential amplifier A40 is connected to output 41.

In operation, the transmitter is initially set up with the computer disabled by means of manual adjustment of the potentiometer R42 in each circuit to cause the pre-correctors to be set to the best readily achievable state to provide adequate pre-correction of the signal. In this state the input applied to input 40 is OV. The computer is then enabled and will fine tune the control voltages to achieve the best settings for the pre-corrector so that an optimised performance can be achieved by the transmitter and will track changes in the characteristics of the amplifying means so that the pre-corrector characteristics can be automatically appropriately changed.

Figure 12:
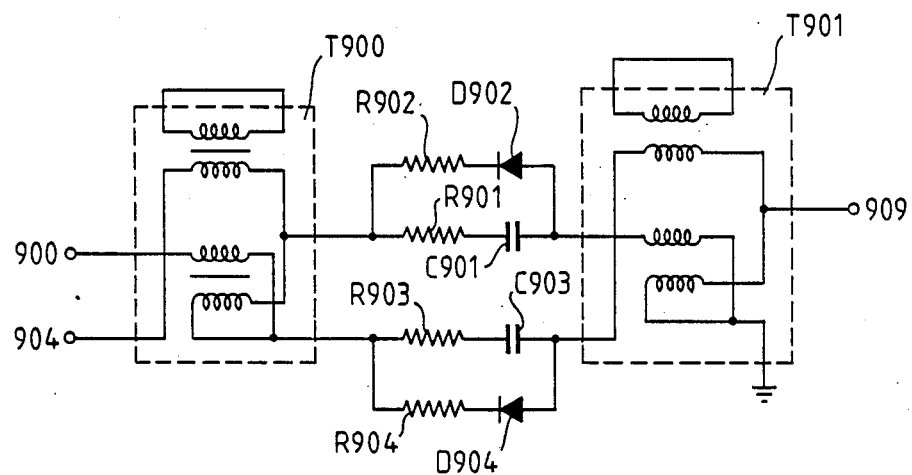
FIG. 12 shows a controllable attenuator for use in the pre-corrector circuit of FIG. 9.

FIG. 12 shows the controllable attenuator 901 in greater detail, the other controllable attenuators being identical in form though component values may be changed. The controllable attenuator shown in FIG. 12 comprises input 900 which is fed via a capacitor C900 to a transformer T900 which converts the unbalanced input signal to a balanced signal. The first branch from the output of the transformer T900 comprises a series arrangement of a resistor R901 and a capacitor C901 arranged in parallel with a series arrangement of a resistor R902 and a diode D902. Similarly, the second branch from the output of the transformer T900 comprises a series arrangement of a resistor R903 and a capacitor C903 arranged in parallel with a series arrangement of a resistor R904 and a diode D904. These branches are combined in a transformer T901 to provide an unbalanced signal at an output 909. The d.c. control voltage present on control input 904 is effective to bias the diodes D902 and D904 via the d.c. paths through the transformers T900 and T901 to ground.

Thus in operation a control voltage applied to input 904 will bias the diodes into or out of conduction and thus the impedance of the two branches will change depending on the bias voltage applied to input 904. This bias voltage can be adjusted so that the diodes D902 and D904 begin to conduct at any desired signal level thus altering the attenuation from that level as a second parallel signal path is then provided though the diode/resistor series arrangement. By varying the control voltage on input 904 the transfer characteristic of the attenuator is varied since the diode break point will be altered.

The component values in both branches between the transformers are made equal and by choosing the relative values of resistors R901 and R902 (and R903 and R904) the change in shape of the input/output amplitude characteristic can be selected.

Thus to form the complete pre-corrector circuit a number of controllable attenuators are arranged in parallel, the number beingdependent on the flexibility of control desired, and separate control signals applied to each attenuator. Thus the diode break point in each attenuator can be separately adjusted and the slope of the input/output amplitude characteristic can be made different for each attenuator by selecting the values of the resistors in the parallel paths of each branch.

I claim:

1. A television transmitter comprising a video signal input for receiving an input video signal which comprises a test signal inserted in a television line during the frame blanking interval; means for modulating a carrier signal by the video signal whereby a modulated carrier signal is produced; non-linear power amplifier means for amplifying the modulated carrier signal; a pre-corrector circuit for applying a correction to the modulated signal before it is applied to the power amplifier means; means for measuring the distortion in the output signal of the power amplifying means including the linearity of the output signal, the distortion measuring means comprising means for demodulating the signal produced at the output of the power amplifying means, means for selecting the line in which the test signal is transmitted, and means for measuring the distortion of at least a portion of the transmitted test signal; means for generating a control signal representative of the measured distortion of the output signal of the power amplifying means; and means for applying the control signal to a control input of the pre-corrector circuit characterised in that the pre-corrector circuit comprises a plurality of subsidiary correction circuits, each subsidiary pre-correction circuit being provided primarily for correction of a given different parameter and that the control signal comprises a plurality of subsidiary control signals for application to the corresponding subsidiary pre-correction circuit to vary the transfer characteristic of the pre-correction circuit in such a manner as to reduce the distortion to a minimum value, one of said pre-correction circuits including means for generating a subsidiary linearity control signal representative of the linearity of the output signal of the power amplifying means, and means for applying the subsidiary linearity control signal to a control input of a subsidiary linearity pre-corrector circuit to vay the transfer characteristic thereof to reduce the non-linearity to a minimum value.

2. A television transmitter as claimed in claim 1, in which the portion of the test signal comprises a staircase waveform comprising a plurality of equal sized steps extending from black level to peak white level and the means for measuring the linearity comprises means for comparing the amplitude of each step produced from said power amplifying means with a reference value.

3. A television transmitter as claimed in claim 2, in which the reference value for each step is derived from a potential divider connected between voltages corresponding to the top and bottom of the staircase.

4. A television transmitter as claimed in claim 1, wherein the linearity pre-corrector circuit has a plurality of control inputs, a control signal applied to each input being effective to independently vary the transfer characteristic of the linearity pre-corrector.

5. A television transmitter as claimed in claim 4, in which the portion of the test signal comprises a staircase waveform having a constant amplitude colour sub-carrier signal superimposed on each step thereof and the means for measuring the differential gain comprises means for measuring the amplitude of the sub-carrier signal superimposed on each step, and means for producing output signals proportional to the amplitude of the sub-carrier signal superimposed on each of the steps of the staircase.

6. A television transmitter as claimed in claim 5 comprising a clamping circuit through whcih the sub-carrier signal superimposed on all the steps of the staircase is passed, the action of the clamping circuit being controlled so that the amplitude of the output representative of the amplitude of the sub-carrier signal superimposed on the step below the peak white value maintains a substantially constant value.

7. A television transmitter as claimed in claim 4, including means for measuring the differential gain of the power amplifying means, means for generating a subsidiary differential gain control signal representative of the differential gain of the output of the power amplifying means, and means for applying the subsidiary differential gain control signal to a control input of a subsidiary differential gain pre-corrector circuit to vary the transfer characteristic thereof in such a manner as to reduce the differential gain to a minimum value.

8. A television transmitter as claimed in claim 7, wherein the differential gain pre-corrector circuit has a plurality of control inputs, a control signal applied to each input being effective to independently vary the transfer characteristic of the differential gain pre-corrector.

9. A television transmitter as claimed in claim 8, in which the linearity and/or differential gain pre-correctors each comprise a plurality of individually controllable attenuators, the control signals controlling the gain of the attenuators and setting the gain of the attenuators to different values above and below a selected input signal amplitude, the selected input signal value being independently selctable for each attenuator.

10. A television transmitter as claimed in claim 9, comprising both linearity and differential gain pre-correctors in which the linearity pre-corrector comprises a filter which passes only double sideband frequencies.

* * * * *